Jan. 5, 1965   G. D. GREEN ETAL   3,164,028
APPARATUS FOR INDEXING WORK PARTS
Filed Nov. 9, 1960   2 Sheets-Sheet 2
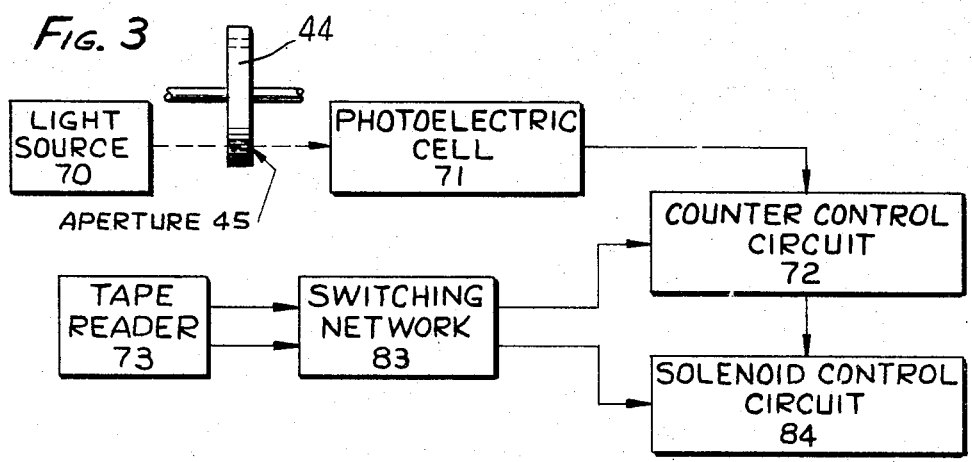
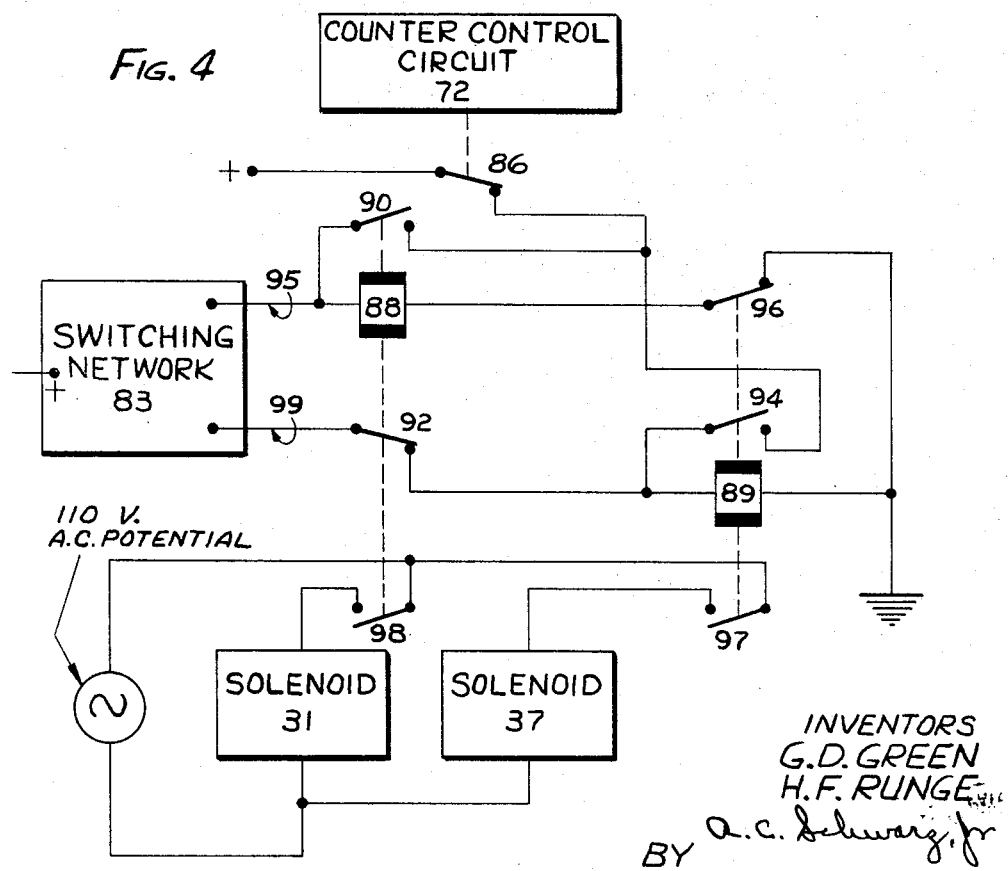
INVENTORS
G.D. GREEN
H.F. RUNGE
BY A.C. Schwarz Jr.
ATTORNEY United States Patent Office 3,164,028
Patented Jan. 5, 1965

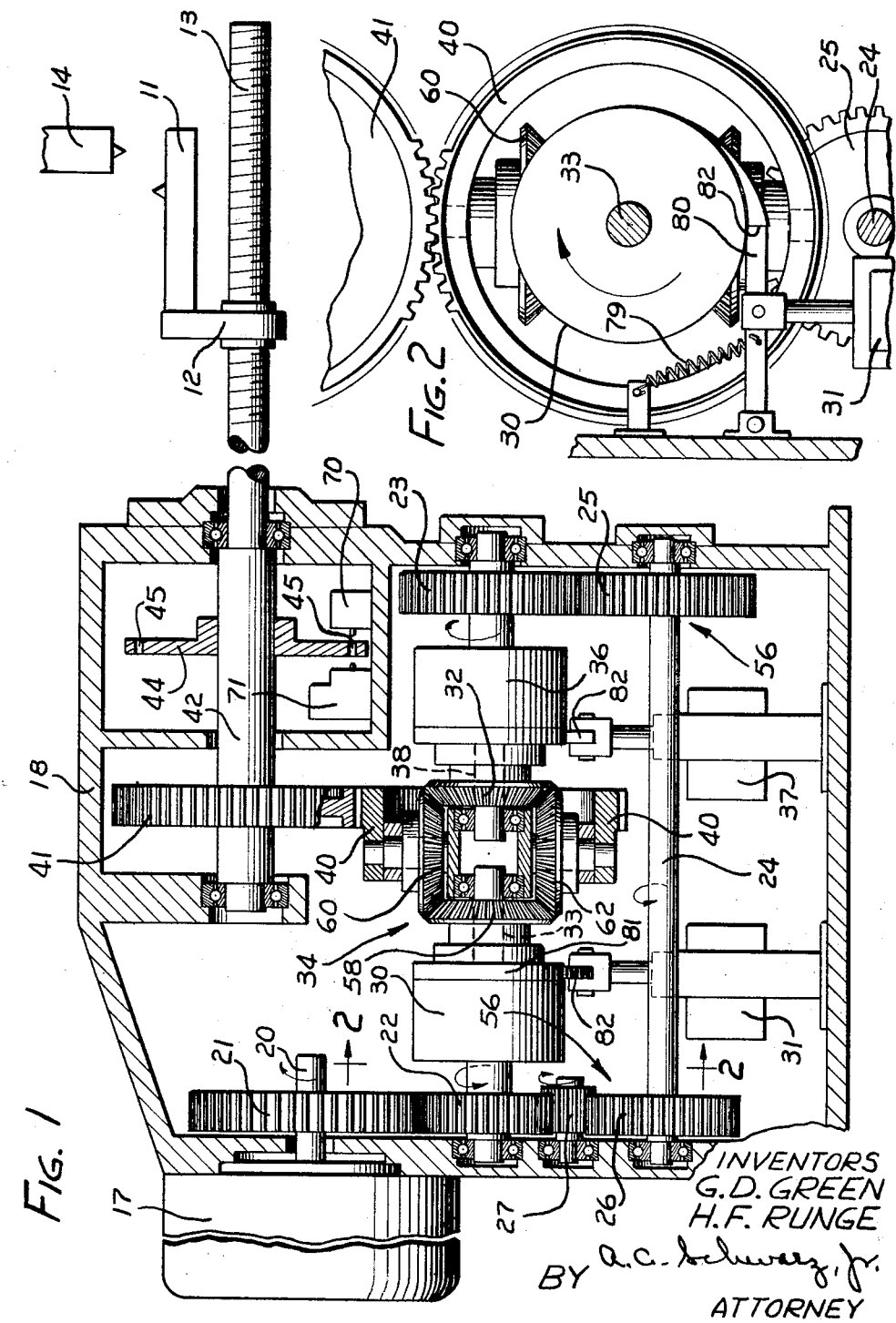

3,164,028
APPARATUS FOR INDEXING WORK PARTS
Geoffrey D. Green, Oak Park, Ill., and Heinz F. Runge, Madison, Wis., assignors to Western Electric Company, Incorporated, New York, N.Y., a corporation of New York
Filed Nov. 9, 1960, Ser. No. 68,276
4 Claims. (Cl. 74—365)

This invention relates to indexing apparatus, and more particularly to apparatus for selectively advancing work parts a predetermined extent in either one of two directions and for sequentially indexing work parts adjacent successive work stations.

In the fabrication of certain types of work parts, it is often necessary for the parts to be selectively advanced a predetermined amount in a given direction so as to facilitate an operation on each work part. It is further desirable in many instances, for the work part to be initially moved a predetermined distance in a first direction for an initial operation thereon and to be subsequently moved a predetermined distance in either the first direction or in a second direction for a subsequent operation thereon.

In the past it has been often necessary to accomplish the positioning functions just mentioned manually, especially where sequential positioning of articles is desired, because of cumulative error in machines performing these operations.

It is, therefore, an object of this invention to provide an apparatus for accurately indexing work parts adjacent to work stations.

Another object of the invention is to provide an apparatus for sequentially indexing articles which is substantially free of cumulative error.

A further object of the present invention is to provide an improved apparatus for selectively advancing work parts in either one of two directions and to a predetermined extent.

A still further object of the invention is to provide apparatus for initially moving a work part in a first direction for a first predetermined distance and for subsequently selectively moving the work part for a second predetermined distance in either the same direction or in a second and different direction.

Still another object of the instant invention is to provide an apparatus for selectively indexing members in one of two directions as determined by a reversible output of a differential unit of the apparatus and for a predetermined distance as regulated by a tape controlled counter circuit of the apparatus.

With these and other objects in mind, the present invention contemplates an article advancing mechanism for accurately indexing a work part wherein the mechanism includes a rotary means for moving the member. Operative upon rotation of the rotary member, is a photoelectric cell adapted to emit pulses depending upon the number of rotations of the rotating member.

In order to actuate the rotary member, there is provided a differential unit associated with a pair of opposing clutches for causing an output drive in either a first or second direction from the differential to the rotary member. There is further provided a tape controlled circuit to engage selectively one or the other of the clutches. Associated with the tape control circuit is a counter, which is operative when the number of pulses from the photoelectric cell corresponds to the tape control setting of the counter, to disengage the operating clutch so as to cause the mechanism only to move the member precisely the predetermined amount corresponding to the setting of the tape.

Other objects and advantages of the invention will become apparent by reference to the following description and the accompanying drawings illustrating a preferred embodiment thereof, in which:

FIG. 1 is a vertical sectional view of the positioning apparatus of the invention;

FIG. 2 is an enlarged, fragmentary vertical sectional view taken along the plane of line 2—2 of FIG. 1 and looking in the direction of the indicating arrows;

FIG. 3 is a block diagram of control mechanism for the apparatus of the invention; and FIG. 4 is a simplified schematic diagram of a solenoid control circuit for the positioning apparatus of the present invention.

Referring now to the drawings, wherein like reference numerals designate similar parts throughout the various views, there is shown (FIG. 1) a work part 11 movably secured with a threaded holder 12. Through the holder 12 passes a moving member such as a positioning screw 13 for advancing the work part 11 with the threaded holder 12. By rotating the positioning screw 13 a predetermined amount within the holder 12 (which is prevented from rotating by a means not shown), the work part 11 may be accurately positioned relative to a fabricating station 14.

Mounted in a housing 18 is a drive motor 17 having a shaft 20 with a gear 21 splined thereon. The gear 21 drives a gear 22 and, through a reversing gear train 56 (including gears 27, 26 and 25), also drives a gear 23. Because of the arrangement of the gear train 56, the gears 22 and 23 rotate in opposite directions but at the same rate of speed.

More specifically, the gear train 56 includes a shaft 24, one end of the shaft 24 having secured thereto the gear 25 which meshes with the gear 23, the other extremity of the shaft 24 having the gear 26 secured thereon which meshes with the idler gear 27, which is driven by the gear 22.

At one extremity of the gear train 56, the gear 22 has secured thereto a first single revolution clutch 30 which, when actuated by a first solenoid 31, transmits rotary motion from the gear 22 to a shaft 33 splined to a bevel gear 58 of a differential unit 34. This arrangement causes the rotation in a first direction of meshing bevel gears 60 and 62 and a ring gear 40, which is attached to the gears 60 and 62.

While the ring gear 40 is thus rotating in a first direction, the attached bevel gears 60 and 62 run around a stationary bevel gear 32 which is splined to a shaft 38 secured to a second and temporarily stationary single revolution clutch 36 on the opposite side of the differential unit 34.

The first and second clutches 30 and 36 may be any conventional single revolution type clutch, such as for example, the clutch disclosed in U.S. Patent 2,711,237, issued to H. W. Wylie on June 21, 1955, or the like.

It can be seen further that the gear 23 has secured thereto the second single revolution clutch 36 which, upon actuation, is rotatable in the opposite direction from that of the clutch 30. Therefore, when the single revolution clutch 36 is actuated by a second solenoid 37, the clutch 36 rotates the shaft 38 and the bevel gear 32 attached thereon causing the ring gear 40 of the differential unit 34 to revolve in the other direction. In this instance, the bevel gears 60 and 62 run around the bevel gear 58 which is then stationary.

The ring gear 40 of the differential unit 34 meshes with a gear 41 which is splined to a shaft 42 attached to the positioning screw 13. Therefore, when the ring gear 40 of the differential unit 34 rotates in one direction, the work part 11 is moved by the positioning screw 13 in a first direction, whereas when the ring gear 40 rotates in the reverse direction, the work part 11 is moved by the positioning screw 13 in the opposite direction. From this, it is apparent that the positioning screw 13 will be rotated in one direction when one clutch is engaged and in the other direction when the other clutch is engaged.

The shaft 42 also has secured thereto a disc 44 containing two apertures 45—45 (180° apart) for permitting illumination from a light source 70 to fall upon a photoelectric cell 71 to render the cell conductive for producing an electrical pulse each time the disc 44 rotates through one-half revolution.

In FIG. 2 of the drawings there is shown a vertical sectional view through the single revolution clutch 30, the clutch illustrated being adapted for clockwise revolution when a dog 80 is pulled by the solenoid 31 against the action of a spring 79 away from engagement with a lug 82 of the driven side 81 of the clutch 30. Such disengagement releases a trip mechanism (not shown) within the clutch 30 to couple the driven side to the driving side for rotation therewith. Upon de-energization of the solenoid 31, the spring 79 re-engages the dog 80 with the lug 82 (1) to actuate the trip mechanism to disengage the driven side from the driving side of the clutch 31, and (2) to arrest rotational motion of the driven side 81. Such operation is characteristic of commercially available single revolution clutches and hence is conventional.

In operation, with particular reference to FIGS. 3 and 4 of the drawings, a switching network 83 directs pulses derived from a tape reader 73 to a counter control circuit 72 and a solenoid control circuit 84. In accordance with information derived from punched tape, which is manifested by the pulses, the switching network 83 selectively directs a pulse to either a lead 95 or a lead 99 of the solenoid control circuit 84. The applictaion of a pulse to the lead 95 results in the energization of a relay 88, whereas, a relay 89 is energized upon application of a pulse to the lead 99.

If the relay 88 is energized, the solenoid 31 is activated causing the single revolution clutch 30 (FIGS. 1 and 2) to rotate the gears 58, 60 and 62 of the differential unit 34 in a first direction. On the other hand, if the relay 89 is energized, the solenoid 37 is activated causing the single revolution clutch 36 to rotate the gears 32, 60 and 62 of the differential unit 34 in the opposite direction.

Referring again to FIGS. 3 and 4 of the drawings, the tape reader 73 momentarily closes contacts (not shown) in accordance with the configuration of holes in a particular row of punched tape so as to cause pulses to flow through the switching network 83 to the counter control circuit 72 and the solenoid control circuit 84. The tape reader 73 is of any standard type which advances a punched tape intermittently. The tape reader 73 advantageously also contains on the drive shaft thereof a cam which closes contacts (not shown) leading to and activating a conventional stepping switch in the switching network 83 each time the tape is advanced one position to a successive row of holes. Therefore, depending upon the configuration of the tape and relative position of the stepping switch in the switching network 83, either the relay 88 or the relay 89 may receive a pulse energizing the same. The relay 88 or the relay 89 (as the case may be) is then maintained in an energized condition by current through a normally closed switch 86 due to the closing of locking contacts 90 or locking contacts 94, respectively, until the normally closed switch 86 is opened by the counter control circuit 72.

In addition to controlling the switching network 83 and the solenoid control circuit 84, the tape reader 73 also sets a counter (not shown) in the counter control circuit 72 in accordance with the information derived from the punched tape. This setting is such that the counter control circuit 72 opens the normally closed switch 86 of the solenoid control circuit 84 causing the relay 88 controlling the solenoid 31 or the relay 89 controlling the solenoid 37 to be deenergized when the number of pulses from the photoelectric cell 71 (FIGS. 1 and 3) corresponds to the tape control setting of the counter of the counter control circuit 72. This causes the disengagement of the appropriate single revolution clutch so as to stop the gears within the differential unit 34 and also the ring gear 40 from rotating, thereby accurately positioning the work part 11.

With particular reference to FIG. 4 of the accompanying drawings, there is shown a simplified schematic diagram of the solenoid control circuit 84 of the present invention for selectively energizing the solenoids 31 and 37 for predetermined periods of time and then for deenergizing the same so as to facilitate the accurate positioning of a work part relative to a fabricating station. As mentioned before, in accordance with the configuration of punched tape in the tape reader 73 (FIG. 3), the switching network 83 is conventionally caused to energize either the relay 88 or the relay 89 controlling the solenoids 31 and 37, respectively.

It can be seen in FIG. 4 that if the switching network 83 causes the relay 88 to close normally open contacts 98 (thereby energizing the solenoid 31), the relay 88 simultaneously opens normally closed contacts 92 leading to the relay 89 which prevents the relay 89 from being rendered operative. Conversely, if the switching network 83 selectively energizes the relay 89 leading to the solenoid 37 by closing normally open contacts 97, the relay 88 is simultaneously prevented from operating due to the opening of normally closed contacts 96. The purpose for simultaneous energization of one relay and deactivation of the other relay is to preclude the possibility of both solenoids being accidentally operated at the same time.

From the above description, it is apparent that the apparatus of the present invention is particularly adapted for selectively advancing parts in the same or different directions to predetermined extents, the directions and extents of indexing or advancing being accurately controlled by suitable indications on a punched tape. It is also apparent that the mechanism rendered operative by the configuration of the punched tape through the tape reader 73 and the switching network 83 comprises a reversible differential unit 34 containing an electrically operated single revolution clutch on opposing sides of the unit.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. Apparatus for indexing a work part, which comprises:

rotating means for selectively moving the work part in one of two opposite directions along a predetermined path;

means rotated by said rotating means for indicating in prescribed increments the distance traveled by the work part from an initial position thereof;

photoelectric means for producing an output pulse for each indication of an increment in work part travel;

means for counting such output pulses continuously to provide a measure of the total distance traveled by the work part; and clutch means, responsive to said counting means, for rotating said rotating means and including braking means for arresting the movement of the work part when the work part has been indexed a predetermined distance in the preselected direction.

2. Apparatus for indexing a work part, which comprises:

a rotary threaded shaft on which the work part is mounted for linear movement along said shaft upon rotation thereof;

a pair of electromagnetically actuated clutches selectively engaged to rotate said shaft in one of two opposite directions, thereby moving the work part in the direction along said shaft corresponding to such rotation;

a motor for driving both of said clutches, one of which clutches is engaged at a time to transmit rotation to said shaft;

an apertured disc mounted for rotation with said threaded shaft;

photoelectric means for sensing the movement of the apertures in said disc and for producing a series of output pulses proportional to the total rotation of said shaft and thus proportional to the linear movement of the work part;

a counter for counting such output pulses; and means, responsive to said counter, for electromagnetically disengaging the operative one of said clutches when a predetermined number of output pulses from said photoelectric means, corresponding to a prescribed distance the work is to be indexed from an initial position thereof, has been counted.

3. The apparatus as recited in claim 2, wherein the photoelectric means comprises a light source and a photoelectric cell which are separated one from the other by said disc such that the apertures intermittently pass between said light source and said photoelectric cell to produce a pulse of electrical current;

wherein means are provided for converting information received from a punched tape into electrical impulses which electromagnetically engage that one of the clutches which will rotate the threaded shaft in a direction in accordance with the punched information on the tape, further electrical impulses being fed to the counter to dictate the number of current pulses to be received thereby from said photoelectric cell for a particular indexing operation on the work part; and wherein the counter includes means for presetting the number of current pulses to be received from said photoelectric cell, dictated by the punched tape, so that the clutch-disengaging means is actuated when the preset number of current pulses is received to disengage electromagnetically the operative one of the clutches.

4. The apparatus as recited in claim 2, wherein the electromagnetically acuated clutches are so constructed and arranged that one half of each clutch is coupled to the motor and is always rotated thereby, and so that the remaining half of the disengaged clutch is locked against rotation while that of the engaged clutch transmits rotation to the threaded shaft; and wherein a reversible gear differenial unit is provided for transmitting rotation from the operative one of the clutches to the threaded shaft, the clutches being disposed one on either side of said differential unit and each clutch being directly coupled to an associated gear on that side of said unit, so that the engaged clutch causes said differential unit to rotate about the gear held fast by the disengaged portion of the other clutch, thus transmitting rotation to the threaded shaft.

References Cited in the file of this patent

UNITED STATES PATENTS

| | | |
|---|---|---|
| 2,364,147 | Jones | Dec. 5, 1944 |
| 2,462,393 | Haynes | Feb. 22, 1949 |
| 2,710,934 | Senn | June 14, 1955 |
| 2,748,665 | Senn | June 5, 1956 |
| 2,911,868 | Thomson | Nov. 10, 1959 |
| 2,982,143 | Kohl | May 2, 1961 |